United States Patent [19]

Harrow et al.

[11] 4,325,976

[45] Apr. 20, 1982

[54] REFORMED RICE PRODUCT

[75] Inventors: Alastair D. Harrow, Rushden; John W. Martin, Oakley, both of England

[73] Assignee: Thomas J. Lipton, Inc., Englewood Cliffs, N.J.

[21] Appl. No.: 131,331

[22] Filed: Mar. 18, 1980

[30] Foreign Application Priority Data

Mar. 22, 1979 [GB] United Kingdom ............... 10180/79

[51] Int. Cl.³ .................... A21D 2/00; A21D 10/00; A23L 1/10
[52] U.S. Cl. ..................... 426/104; 426/560; 426/622; 426/448; 426/449; 426/458; 426/463
[58] Field of Search ............... 426/104, 551, 622, 558, 426/559, 560, 618, 625, 640, 649, 448, 449, 452, 458, 463, 464, 467, 516, 811, 557, 451

[56] References Cited

U.S. PATENT DOCUMENTS

| | | | |
|---|---|---|---|
| 2,914,005 | 11/1959 | Gorozpe | 426/516 |
| 3,071,471 | 1/1963 | Gorozpe | 426/462 |
| 3,340,067 | 9/1967 | Wallis | 426/558 |
| 3,464,828 | 9/1969 | Cummisford | 426/811 |
| 3,628,966 | 12/1971 | Katsuya et al. | 426/104 |
| 3,780,186 | 12/1973 | Troy | 426/557 |
| 3,860,735 | 1/1975 | Hoshino | 426/458 |
| 4,230,735 | 10/1980 | Yoshida et al. | 426/451 |

FOREIGN PATENT DOCUMENTS 2365966 4/1978 France .
1067793 5/1967 United Kingdom .

*Primary Examiner*—Raymond N. Jones
*Assistant Examiner*—Elizabeth J. Curtin
*Attorney, Agent, or Firm*—Brumbaugh, Graves, Donohue & Raymond

[57] ABSTRACT

A reformed rice product is made by extruding a dough through a low-pressure, pasta-type extruder to form simulated rice grains which are then dried at a temperature of up to 150° C. to a final moisture content not exceeding 15% of the product. The dough is made by adding water to a dry composition comprising a mixture of pregelatinized and ungelatinized flour, sodium chloride and fat in powder form.

19 Claims, No Drawings

REFORMED RICE PRODUCT

This invention relates to a composition and process for making a reformed rice product, particularly a so-called instant rice product, which can be quickly prepared for eating. This is accomplished by the addition of an appropriate proportion of water at a temperature ranging from 90°–100° C., whereupon the rice product rehydrates within 3 minutes to obtain a product having the texture and appearance of natural rice.

The reformed rice product of the present invention is particularly useful in so called instant meals, made simply and quickly by adding hot water to a mixture of dried ingredients.

It has been proposed before to make instant or quick-cooking rice products, either from whole grain or flour. In the former case, the rice is cooked and then dried in such a manner as to facilitate rapid rehydration. When flour is used, it is made into a dough and extruded into rice-grain-shaped particles and dried. However, it has proved difficult to make such reformed rice products which have the appearance, taste and texture of natural rice and yet can be rehydrated quickly merely by adding hot water.

It is therefore an object of the present invention to provide an economical and efficient process for producing a reformed rice product having the desired appearance and organoleptic properties to simulate natural rice grains.

According to the invention a dry composition for use in the production of a reformed rice product comprises:

(a) a mixture of pregelatinised and ungelatinised flour, the proportion of pregelatinised flour being from 30-70% by weight of the mixture, (b) at least 3.0% sodium chloride by weight of the composition, and (c) an amount up to 10% fat in powder form, by weight of the composition.

The flour used in the composition is preferably at least partly rice flour, but virtually all the usual kinds of flour or mixtures thereof can in principle be used, for example wheat flour, potato flour, corn flour, tapioca flour, waxy maize flour, or mixtures thereof. Products which do not contain any rice flour are usually termed artificial rice products, but it is preferred for taste and other obvious reasons to use at least a major proportion of rice flour, more preferably exclusively rice flour.

The ratio of pregelatinised (ie precooked) to ungelatinised flour in the compositions is critical. If less than 30% of the flour used is pregelatinised, the reformed rice products are found to have poor quick-rehydrating characteristics. On the other hand the proportion of gelatinised flour should not exceed 70% by weight of the composition, since a higher proportion affects the extrusion characteristics and it is difficult to control the size and shape of the simulated rice grains which are made.

The presence of sodium chloride affects the rehydration properties of the reformed rice product, besides the effect on taste. In order to achieve the required quich rehydration properties, this ingredient is preferably used in a proportion between 4% and 12% by weight of the composition, the higher limit being dictated by taste considerations.

In order to promote rapid rehydration, a puffing aid can be added to the composition if desired. The puffing aid can be any edible substance which liberates a harmless gas on heating such as ammonium (bi)carbonate or an alkali metal bicarbonate and an alkali metal hydrogen tartrate. A particularly preferred puffing aid is a mixture of potassium hydrogen tartrate and sodium bicarbonate especially in the proportions of about 70:30 parts by weight. The optimum amount of puffing aid can be found in each particular case, but in general an amount of 1-3% of the puffing air by weight of the composition will in most cases be adequate.

An important aspect of the present invention is the use of a proportion of fat in powder form in the composition. Spray-dried fat is preferably used, and this can be obtained by spray drying an emulsion of a fat with a carrier, such as maltodextrin, lactose or casein and the like, the amount of the carrier generally being about 30% of the resultant spray-dried fat. Suitable spray-dried fats are commercially available.

The Applicants have found that when normal fat is mixed into the compositions the extrusion properties of the dough and the rapid rehydration of the reformed rice product are deleteriously effected. However, when fat in powder form is used, such harmful effects are considerably decreased and there is a beneficial effect on the extrusion properties of the dough. It is believed that this is because fat in powder form can be much more easily and homogeneously dispersed in the composition than liquid or hard fat as such, and particularly when spray-dried fat is used, the fat is gradually released from the carrier matrix to facilitate extrusion under pressure.

The proportion of powdered fat in the compositions is normally up to about 10% by weight, preferably from 3-6% by weight, based on the dry composition. This corresponds to 0.7-7% pure fat, preferably 2.1-4.2% pure fat, when a spray-dried fat is used with a carrier, as described above. The type of fat is not critical, either animal and/or vegetable fat being usable, provided they are incorporated in the composition in powder form. The methods for producing fat in powder form are well known in the art, and the optimum type of spray-dried fat and its amount can readily be determined for the particular end product properties desired.

According to a preferred embodiment of the invention, some or all of the fat in powdered form is added to the composition in the form of whole egg-powder or egg-yolk powder. Whole egg powder contains approximately 10.5% fat whereas egg yolk powder contains about 32.6% fat. Such fat is in especially finely divided form and it acts as a particularly effective lubricant or extrusion aid. An amount of 1 to 7% whole egg or egg-yolk powder generally suffices to achieve adequate processing conditions and a good texture in the final reformed rice product.

Egg yolk powder is preferred as an ingredient to whole egg powder, because egg white solids are detrimental to the extrusion properties of the dough produced by adding water to the dry composition. However, the addition of an emulsifier such as lecithin in a proportion of 0.5 to 2% by weight of the composition has been found to have a beneficial effect on the extrusion properties of the dough, and it also tends to offset the detrimental effect of any egg white present.

The invention includes a process for the production of a reformed rice product comprising the steps of:

(a) mixing the dry composition according to the invention with water to produce an extrudable dough containing 20%–30% water by weight of the dough, (b) extruding the dough to form simulated rice grains, and (c) drying the simulated rice grains at a temperature up to 150° C. to a moisture content not exceeding 15% by weight of the resultant reformed rice product.

The aqueous dough is preferably extruded using a conventional low pressure pasta-type extruder through a die having generally elliptical apertures, each having a long axis length of from 4 mm to 8 mm, preferably 4 mm to 7 mm, and a short axis length of from 0.5 mm to 3 mm, preferably 1 mm to 1.6 mm. The dough is then cut as it is extruded by a rotating cutting knife adjacent to the outer face of the die. The thickness of the extruded rice grains is then controlled by the speed of the cutting knife in relation to the extrusion rate. As the quick rehydration of the reformed rice product is dependant on the particle size, it is preferred that the cut thickness of the simulate rice grains as extruded is from 0.5 mm to 3 mm, preferably not more than 1.6 mm.

In order to avoid chain formation, ie the sticking together of the cut extruded simulated rice grains, and hence to promote the production of discrete simulated rice grains, the Applicants have found it desirable to use knife blades coated with a synthetic polymer such as polytetrafluoroethylene (eg Teflon, Trade Mark).

The extruded simulated rice grains can be dried in a way known per se, for example by air drying or microwave heating, at an elevated temperatued, preferably at least 80° C., and especially from about 130° to 150° C., but no higher in order to avoid charring the end product. Preferably air drying is performed in a fluidised bed air drier, to give a final moisture content in the product of from 4% to 8% by weight.

The invention will now be illustrated in the following examples, in which parts and percentages are by weight except where otherwise indicated.

EXAMPLE I

A dry composition was prepared by blending the following ingredients:

| grams | |
|---|---|
| 32.45 | pregelatinised rice flour |
| 32.45 | ungelatinised rice flour |
| 4.45 | spray-dried fat |
| 4.45 | sodium chloride |
| 1.48 | 70/30-mixture of Na-tartrate and Na-bicarbonate |

A dough was then prepared by adding 24.72 g water to the dry composition and mixing in a Hobart-type mixer. The dough was fed into a D55 La Parmigiana pasta extruder having a die with generally elliptical apertures (length 5.6 mm, width 1.3 mm), extruded and cut to obtain simulated wet rice grains having a thickness of 1.3 mm. The wet grains were air-dried at 135° C. to a moisture content of 6%. It was then found that the dried reformulated rice product rehydrated within 3 minutes in water of 90° C. and had a good appearance and texture.

EXAMPLE II

The procedure of Example I was repeated except that 2.25 g of spray-dried fat was replaced by 2.25 g whole egg powder.

Extrusion of the dough was performed very easily and the resultant product was capable of rapid rehydration to have a good appearance and texture.

EXAMPLE III

The procedure of Example I was repeated with the exception that instead of spray-dried fat, 4.45 g egg yolk powder was used. The extrusion characteristics of the dough were excellent and the reformed rice product prepared was found to have good rehydration and organoleptic properties.

EXAMPLE IV

The procedure of Example I was repeated except that 1 g lecithin was added to the dough. The extrusion characteristics of the dough were again excellent and the dried product had good rehydration and organoleptic properties.

What is claimed is:

1. A dry composition for use in the production of a reformed rice product, which comprises:
    (a) a mixture of pregelatinised and ungelatinised flour in which the proportion of the pregelatinised flour is from 30% to 70% by weight of the mixture and in which the flour is at least partly rice flour,
    (b) at least 3.0% sodium chloride by weight of the composition, and
    (c) an amount up to 10% of fat in powder form by weight of the composition.

2. A composition according to claim 1, in which the flour comprises a major proportion of rice flour.

3. A composition according to claim 1 in which the amount of sodium chloride is from 4% to 12% by weight of the composition.

4. A composition according to claim 1 which additionally comprises from 1% to 3% by weight of a puffing aid.

5. A composition according to claim 1, in which the fat in powder form is a spray-dried fat.

6. A composition according to claim 5, in which the amount of spray-dried fat is from 1% to 10% by weight of the composition.

7. A composition according to claim 6, in which the amount of the spray-dried fat is from 3% to 6% by weight of the composition.

8. A composition according to claim 1 in which the fat in powder form is present as whole egg or egg yolk powder.

9. A composition according to claim 8, in which the amount of whole egg or egg yolk powder is from 1% to 7% by weight of the composition.

10. A composition according to claim 1, which additionally comprises from 0.5% to 2% by weight of lecithin.

11. A process for producing a reformed rice product which comprises the steps of:
    (a) mixing the composition of claim 1 with a proportion of water sufficient to produce an extrudable dough containing 20% to 30% water by weight of the dough,
    (b) extruding the dough into a form so as to obtain simulated rice grainsand
    (c) drying the simulated rice grains at an elevated temperature up to 150° C., to a moisture content not exceeding 15% by weight of the dried product.

12. A process according to claim 11, in which the dough is extruded through a die having generally elliptical apertures having a long axis length of from 4 mm to 8 mm and a short axis length of from 0.5 mm to 3 mm.

13. A process according to claim 11, in which the extruded dough is cut adjacent to the die face such that the cut thickness of the simulated rice grains is from 0.5 mm to 3 mm.

14. A process according to claim 11, in which the dough is extruded through a die having generally elliptical apertures having a long axis length of from 4 mm to 7 mm and a short axis length of from 1 mm to 1.6 mm and the extruded dough is cut adjacent to the die face such that the cut thickness of the simulated rice grains is not more than 1.6 mm.

15. A process according to claim 11, in which the extruded dough is cut using a knife coated with a synthetic polymer.

16. A process according to claim 15, in which the synthetic polymer is polytetrafluoroethylene.

17. A process according to claim 11 in which the simulated rice grains are dried in a fluidised bed air drier.

18. A process according to claim 11 wherein the simulated rice grains are dried at a temperature of from 130° to 150° C.

19. A reformed rice product in the form of simulated rice grains made by the process according to claim 11.

* * * * *